(12) United States Patent
Woo et al.

(10) Patent No.: US 8,998,146 B2
(45) Date of Patent: Apr. 7, 2015

(54) SPACECRAFT MOMENTUM UNLOAD AND STATION-KEEPING TECHNIQUES

(71) Applicant: Space Systems/Loral, LLC, Palo Alto, CA (US)

(72) Inventors: Byoungsam Woo, San Jose, CA (US); Farid Ganji, Palo Alto, CA (US); John Hutton Cooper, Sunnyvale, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 162 days.

(21) Appl. No.: 13/683,887

(22) Filed: Nov. 21, 2012

(65) Prior Publication Data

US 2014/0138491 A1 May 22, 2014

(51) Int. Cl.
*B64G 1/26* (2006.01)
*B64G 1/28* (2006.01)

(52) U.S. Cl.
CPC . *B64G 1/26* (2013.01); *B64G 1/283* (2013.01)

(58) Field of Classification Search
USPC .................................. 244/165, 169
See application file for complete search history.

(56) References Cited

U.S. PATENT DOCUMENTS

| | | | |
|---|---|---|---|
| 3,937,423 A | | 2/1976 | Johansen |
| 4,537,375 A | * | 8/1985 | Chan .............................. 244/171 |
| 4,725,024 A | * | 2/1988 | Vorlicek ........................ 244/164 |
| 4,767,084 A | | 8/1988 | Chan et al. |
| 5,349,532 A | * | 9/1994 | Tilley et al. ...................... 701/13 |
| 5,383,631 A | * | 1/1995 | Mazzini ........................ 244/169 |
| 5,395,076 A | | 3/1995 | Lichtin et al. |
| 5,400,252 A | | 3/1995 | Kazimi et al. |
| 5,568,904 A | * | 10/1996 | Brock et al. .................. 244/169 |
| 5,810,295 A | * | 9/1998 | Anzel ........................ 244/158.6 |
| 5,850,993 A | * | 12/1998 | Hubert ........................... 244/169 |
| 6,015,116 A | | 1/2000 | Anzel et al. |
| 6,032,904 A | | 3/2000 | Hosick et al. |
| 6,154,692 A | | 11/2000 | Cielaszyk et al. |
| 6,260,805 B1 | * | 7/2001 | Yocum et al. ................. 244/164 |
| 6,296,207 B1 | | 10/2001 | Tilley et al. |
| 6,340,138 B1 | | 1/2002 | Barsky et al. |

(Continued)

FOREIGN PATENT DOCUMENTS

WO 2005/118394 12/2005

OTHER PUBLICATIONS

Wayne M. Kinzel and John Isaacs, Space Telescope Science Institute, Momentum Management Operations Concept (JWST-STScI-001275, SM-12), Dec. 21, 2007; accessed from http://www.stsci.edu/jwst/doc-archive/technical-reports/JWST-STScI-001275.pdf on Jun. 19, 2014.*

*Primary Examiner* — Tien Dinh
*Assistant Examiner* — Alexander V Giczy
(74) *Attorney, Agent, or Firm* — Weaver Austin Villeneuve & Sampson LLP (57) ABSTRACT

Spacecraft momentum management techniques are coordinated with station-keeping maneuvers or other delta-V maneuvers. A body stabilized spacecraft attitude is controlled, the spacecraft including at least one momentum/reaction wheel, and a set of thrusters. A first momentum storage deadband limit is adjusted, the adjustment being related to a first delta-V maneuver window. A momentum management strategy is executed with the adjusted first momentum storage deadband limit such that a first thruster firing that performs desaturation of the momentum/reaction wheel also provides velocity change beneficial to the first delta-V maneuver.

36 Claims, 8 Drawing Sheets

(56) References Cited

U.S. PATENT DOCUMENTS

| | | |
|---|---|---|
| 6,637,701 B1 | 10/2003 | Glogowski et al. |
| 6,921,049 B2 * | 7/2005 | Fowell .......................... 244/164 |
| 7,918,420 B2 | 4/2011 | Ho |
| 2008/0135685 A1 * | 6/2008 | Soldi et al. .................... 244/169 |

* cited by examiner

SPACECRAFT MOMENTUM UNLOAD AND STATION-KEEPING TECHNIQUES

TECHNICAL FIELD

This invention relates generally to spacecraft momentum management and, in particular, to improved momentum management strategies coordinated with spacecraft station-keeping maneuvers or other delta-V maneuvers.

BACKGROUND

The assignee of the present invention manufactures and deploys spacecraft for, inter alia, communications and broadcast services. Such spacecraft carry on board propulsion systems, including a set of thrusters, that may be configured to perform velocity change maneuvers ("delta-V" maneuvers) as well as provide control torques under control of a spacecraft attitude control system. For example, geosynchronous spacecraft are typically required to remain within an assigned orbital station or "box" which has predetermined dimensions. The act of maintaining a geosynchronous spacecraft in its assigned station is referred to as station-keeping. For example, a type of delta-V maneuver referred to as a north-south station-keeping (NSSK) maneuver may be periodically required to control the inclination of the spacecraft's orbital plane with respect to the Earth's equatorial plane. As a further example, spacecraft in low earth orbit may require periodic delta-V maneuvers to compensate for atmospheric drag.

Specific attitudes of body-stabilized satellites with respect to the earth must be maintained in the face of external disturbance torques, including, for example, solar pressure, gravity gradients and magnetic fields. These disturbance torques are typically countered with correction torques generated by exchanging momentum between a satellite body frame and one or more reaction wheels or momentum wheels by changing the rotation rate of the reaction/momentum wheels. Because such wheels have a rotation rate design limit, momentum management techniques are required whereby their stored momentum is periodically desaturated ("unloaded" or "dumped") by applying external control torques to the satellite. These control torques may be provided by firing one or more thrusters that are directed such that a resulting thrust vector defines a moment arm with respect to the satellite's center of mass.

Station-keeping and momentum management techniques are described, for example, in U.S. Pat. Nos. 4,767,084, 6,296,207, and 6,032,904, assigned to the assignee of the present invention, the disclosures of which are incorporated by reference into the present application for all purposes.

Improved techniques that reduce the propellant required for station-keeping are desirable, so as to increase spacecraft life and/or reduce launch costs.

SUMMARY

The present inventors have appreciated that propellant savings may be achieved by biasing a momentum storage deadband during a time interval having a selected relation to a time interval for a delta-V maneuver and executing a momentum management strategy with the biased momentum storage deadband such that thruster firings performed to desaturate a momentum/reaction wheel are biased toward providing a velocity change beneficial to the delta-V maneuver.

In an embodiment, a method provides for control of a body stabilized spacecraft attitude, the spacecraft comprising at least one momentum/reaction wheel configured to maintain the attitude with respect to an axis by storing momentum, and a set of thrusters. The method includes adjusting a first momentum storage deadband limit, the adjustment being related to a first delta-V maneuver window, and executing a momentum management strategy with the adjusted first momentum storage deadband limit such that a first thruster firing that performs desaturation of the momentum/reaction wheel also provides velocity change beneficial to the first delta-V maneuver.

In another embodiment, the adjustment may include shifting the first momentum storage deadband so as to increase, during a time interval proximate to the first delta-V maneuver window, an amount of desaturation required. The method may further include adjusting a second momentum storage deadband limit, the adjustment being related to a second delta-V maneuver window; and executing a momentum management strategy with the adjusted second momentum storage deadband such that a second thruster firing that performs desaturation of the momentum/reaction wheel also provides velocity change detrimental to the second delta-V maneuver. The adjustment may include shifting the second momentum storage deadband limit so as to decrease, during a time interval proximate to the second delta-V maneuver window, an amount of desaturation required.

In a further embodiment, the first delta-V maneuver may be executed using an electric thruster, and the first thruster firing that performs desaturation of the momentum/reaction wheel is a chemical thruster. Alternatively, the first delta-V maneuver may be executed using a chemical thruster, and the first thruster firing that performs desaturation of the momentum/reaction wheel may be a chemical thruster. In another embodiment, the first delta-V maneuver may be executed using an electric thruster, and the first thruster firing that performs desaturation of the momentum/reaction wheel may be an electric thruster.

In another embodiment, a method provides for control of a 3-axis stabilized spacecraft attitude, the spacecraft being in geosynchronous orbit, and comprising at least one momentum/reaction wheel configured to maintain the attitude with respect to an axis by storing momentum, and a set of thrusters. The method includes adjusting a first momentum storage deadband limit, the adjustment being related to a first north south station-keeping (NSSK) maneuver window, and executing a momentum management strategy with the adjusted first momentum storage deadband limit such that a first thruster firing that performs desaturation of the momentum/reaction wheel also provides velocity change beneficial to the first NSSK maneuver.

In a further embodiment, the adjustment includes shifting the first momentum storage deadband limit so as to increase, during a time interval proximate to the first NSSK maneuver window, an amount of desaturation required.

In another embodiment, the method further includes adjusting a second momentum storage deadband limit, the adjustment being related to a second NSSK maneuver window; and executing a momentum management strategy with the adjusted second momentum storage deadband limit such that a second thruster firing that performs desaturation of the momentum/reaction wheel also provides velocity change detrimental to the second NSSK maneuver.

In an embodiment, the adjustment may include shifting the second momentum storage deadband limit so as to decrease, during a time interval proximate to the second NSSK maneuver window, an amount of desaturation required.

In another embodiment, adjusting the momentum storage deadband may include narrowing the deadband during a first time interval proximate to a crossing of a descending node, and widening the deadband during a second time interval proximate to a crossing of an ascending node. Adjusting the momentum storage deadband may include narrowing the deadband at a first time interval proximate to a crossing of an ascending node, and widening the deadband at a second time interval proximate to a crossing of a descending node.

In yet a further embodiment, a method provides for control of a body stabilized spacecraft attitude, the spacecraft comprising at least one momentum/reaction wheel configured to maintain the attitude with respect to an axis by storing momentum, and a set of thrusters. The method may include making a first adjustment to a momentum storage deadband, the first adjustment being related to a first delta-V maneuver window, the first adjustment including a widened deadband proximate to and prior to the first delta-V maneuver window, and a narrowed deadband during the first delta-V maneuver window. The method may further include executing a momentum management strategy with the first adjusted momentum storage deadband such that a first thruster firing that performs desaturation of the momentum/reaction wheel also provides velocity change beneficial to the first delta-V maneuver.

In an embodiment, a body stabilized spacecraft includes at least one momentum/reaction wheel configured to control a spacecraft attitude with respect to an axis by storing momentum, a set of thrusters, and a controller communicatively coupled with the at least one momentum/reaction wheel and the set of thrusters. The controller may be configured to adjust a first momentum storage deadband limit, the adjustment being related to a first delta-V maneuver window; and execute a momentum management strategy with the adjusted first momentum storage deadband limit such that a first thruster firing that performs desaturation of the momentum/reaction wheel also provides velocity change beneficial to the first delta-V maneuver.

BRIEF DESCRIPTION OF THE DRAWINGS

Features of the invention are more fully disclosed in the following detailed description of the preferred embodiments, reference being made to the accompanying drawings, in which like reference numerals designate like structural element, and in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

Figure 1A:
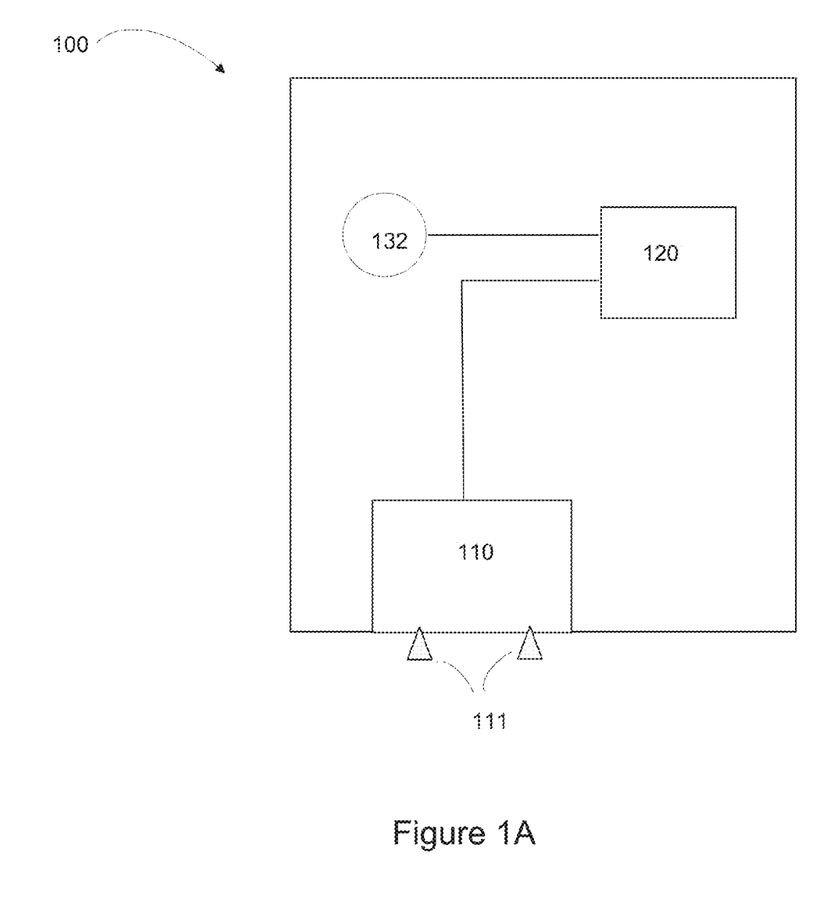
FIGS. 1A and 1B illustrate an example diagram of a spacecraft according to an embodiment.

Referring now to FIG. 1A, an example block diagram of a spacecraft 100 according to an embodiment is illustrated. Spacecraft 100 may include propulsion subsystem 110 and spacecraft controller 120. In an embodiment, for example, propulsion subsystem 110 may include propulsion equipment, such as tankage and control and service devices (not illustrated) and thrusters 111. Based on the respective primary energy source, each thruster 111, may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon.

Referring still to FIG. 1A, spacecraft controller 120 may include or be included in a spacecraft attitude and orbit control subsystem. In the illustrated example, spacecraft controller 120 is communicatively coupled with propulsion subsystem 110 and may be configured to control the operation of propulsion subsystem 110, including thrusters 111.

In an embodiment, spacecraft controller 120 may be configured to control the spacecraft in a three-axis stabilized ("body stabilized") mode. Referring still to FIG. 1A, in the illustrated embodiment, spacecraft controller 120 is also communicatively coupled with a momentum storage system 132. Momentum storage system 132, which may include, for example, one or more momentum wheels or reaction wheels (hereinafter, "momentum/reaction wheel"), may be configured to exchange momentum with a spacecraft body frame to control spacecraft rotation rates.

Momentum storage system 132 may have a storage capacity defined, for example, in terms of a permissible range of momentum/reaction wheel speeds. To the extent that the momentum storage capacity of momentum storage system 132 would otherwise be exceeded, wheel desaturation (momentum "dumping" or "unloading") may need to be performed by an external actuator, such as thruster 111.

Figure 1B:
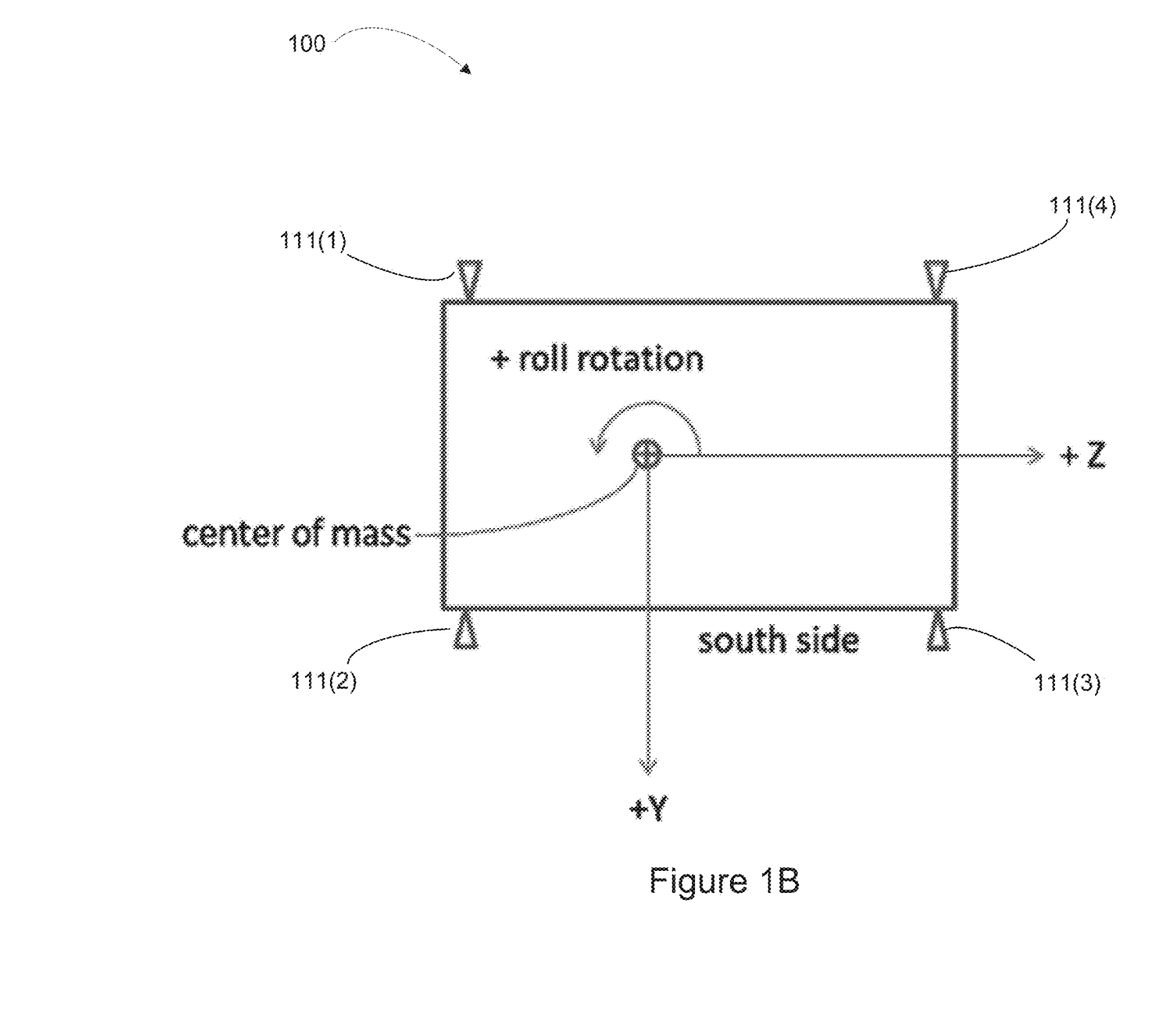

Referring now to FIG. 1B, a body axis system including yaw (Z) axis, pitch axis (Y) and roll axis (orthogonal to plane of figure) of spacecraft 100 is illustrated. In the illustrated configuration, each of four thrusters 111(1), 111(2), 111(3), and 111(4) may produce roll torque around the center of mass, and may be referred to, for convenience, as a "roll thruster". For example, either of roll thruster 111(1) and roll thruster 111(3), fired singly or together, may produce positive torque about the roll axis. Similarly, either of roll thruster 111(2) and roll thruster 111(4), fired singly or together, may produce negative torque about the roll axis. In an embodiment, the roll thrusters on either or both of the north side and the south side of the satellite may be used for momentum management. More specifically, firing any of roll thruster 111(1), 111(2), 111(3), and 111(4) may produce a torque that can be used to desaturate a momentum/reaction wheel, thereby unloading accumulated roll momentum.

It will be appreciated that by firing an appropriate pair of roll thrusters simultaneously, substantially pure roll torque may be generated. For example, when roll thruster 111(1) and roll thruster 111(3) are fired simultaneously, the resulting combined impulse may produce a nearly pure torque, with little or no translation delta-V. On the other hand, when a single roll thruster is fired, the resulting impulse will impart a delta-V to the spacecraft, in addition to a torque.

It will be appreciated that, although FIG. 1B illustrates an arrangement of four roll thrusters, a greater or lesser number of roll thrusters may be contemplated. Moreover, similar arrangements of thrusters may be contemplated with respect to the yaw (Z) and pitch (Y) axes. Finally, it should be understood that the thruster arrangement of FIG. 1B illustrates elements of two redundant half-subsystems, and the failure of either half-subsystem must be accommodated without loss of mission. This means, for example, that a first half-subsystem including thruster 111(1) and thruster 111(4) may be required to provide impulse for +/− roll torque and NSSK station-keeping, without recourse to a second half-subsystem including thruster 111(2) and thruster 111(3). Similarly, the second half-subsystem may be required to provide impulse for +/− roll torque and NSSK station-keeping, without recourse to the first half-subsystem.

For purposes of explanation, unload pulses (thruster firings) may be described herein as having a fixed pulse width so that when more momentum desaturation is required, unloads happen more frequently. However, it is within the contemplation of the present disclosure that fixed frequency pulses with varying pulse width could be performed, as well as variable frequency/variable pulse width.

Figure 2:
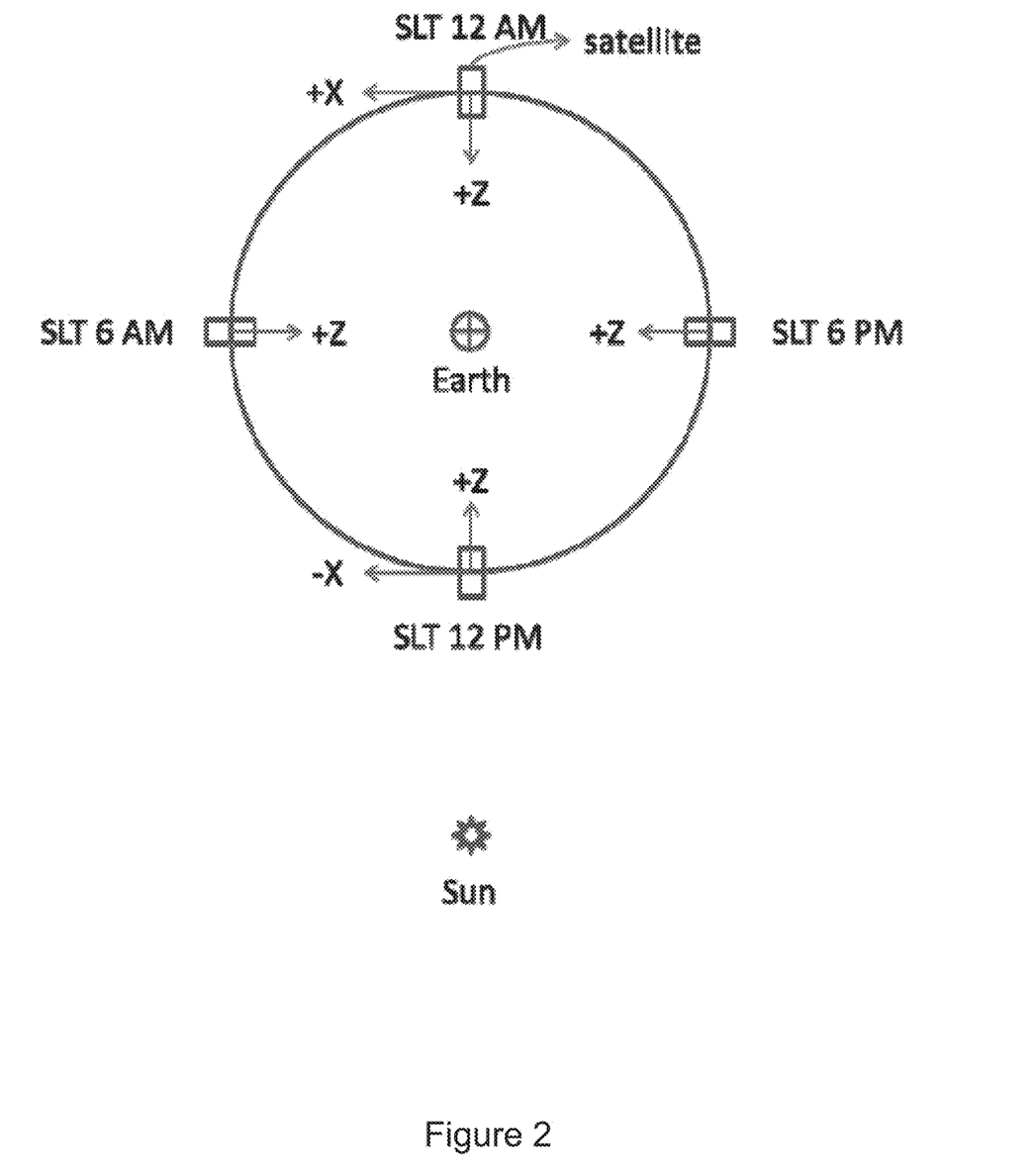
FIG. 2 illustrates an example of spacecraft body reference frame orientation as a function of orbital position.

The presently disclosed techniques may be applied to body stabilized spacecraft in a variety of orbits, including geosynchronous and low earth orbit. For geosynchronous satellites, at least, a major cause of roll momentum accumulation is solar torque. The rate at which roll momentum accumulates due to solar torque is a function of the extent to which the spacecraft presents an unbalanced surface area to the sun, resulting in a misalignment of a center of pressure resulting from solar impingement with the spacecraft center of mass. It may be appreciated that a rate of roll momentum accumulation from solar torque may be correlated with "satellite local time" (SLT), at least for a satellite in near-equatorial orbit, such as a geostationary orbit. Referring now to FIG. 2, for example, it may be observed that momentum accumulation about the roll ('X') axis occurs predominantly during time intervals proximate to (for example, within four hours of) SLT's of 12 AM and 12 PM.

Since the direction of momentum accumulation is fixed in the Sun-Earth coordinate frame while the satellite roll axis rotates in the Sun-Earth coordinate frame, it will be appreciated that the magnitude and sign of momentum accumulation changes as a function of change in SLT.

Figure 3:
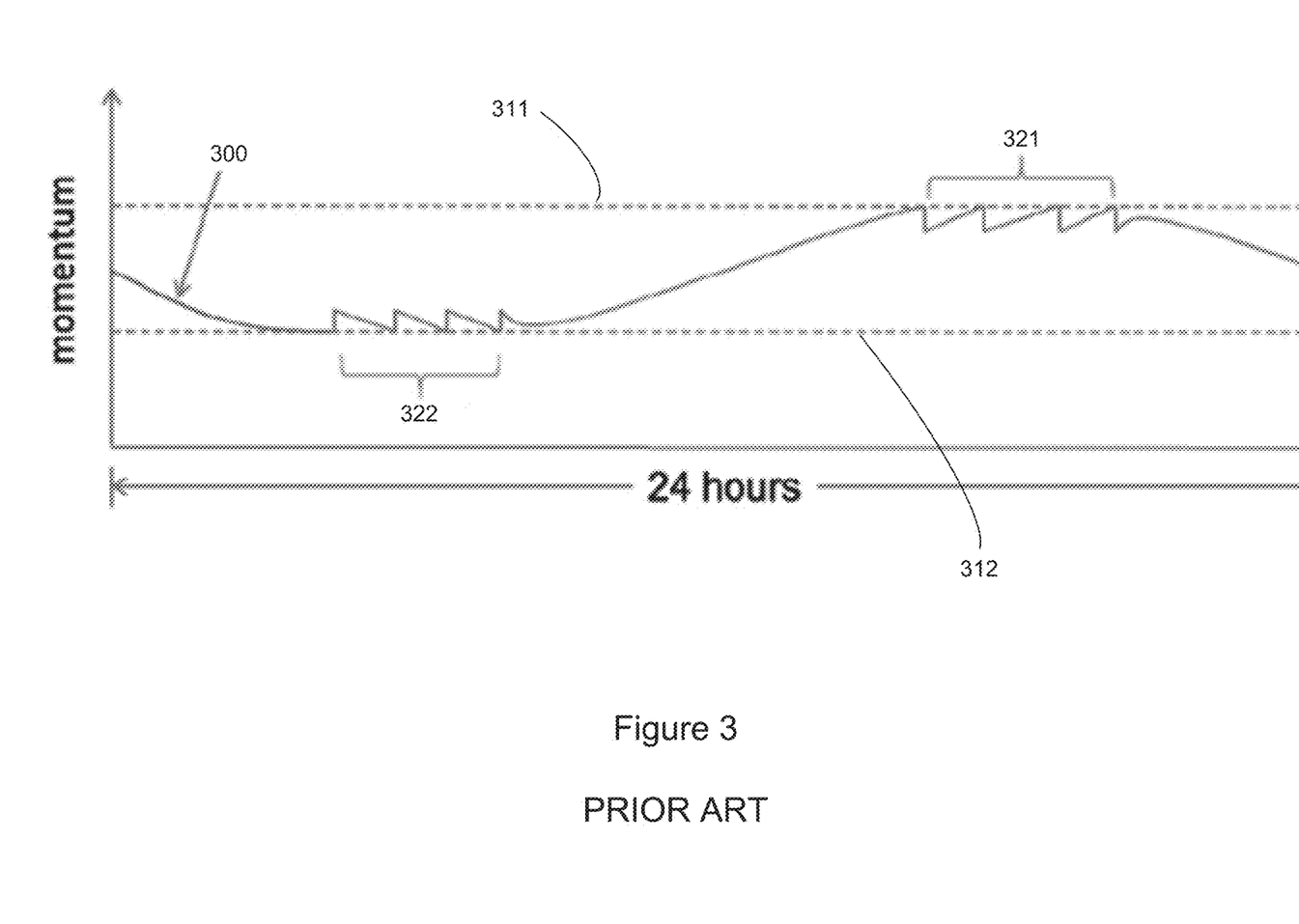
FIG. 3 illustrates an example of spacecraft momentum accumulation as a function of time.

Referring now to FIG. 3, an example of a plot 300 of momentum accumulation versus time for a twenty four hour period is illustrated. It may be observed that momentum accumulation in the spacecraft body axes may be prevented from substantially exceeding nominal deadband (DB) limits 311 and 312. This may be accomplished by thruster unload firings, as illustrated by the saw tooth pattern during time periods 321, and 322, that serve to desaturate the momentum/reaction wheel.

Referring still to FIG. 3, it may be observed that momentum accumulation alternates signs during alternate twelve hour periods. That is, for the illustrated example, during a first twelve hour period, momentum tends to accumulate toward lower deadband limit 312, whereas, in the subsequent twelve hour period, momentum tends to accumulate toward the upper deadband limit 311.

The present inventors have appreciated that propellant savings may be achieved by adjusting lower deadband limit 312 and upper deadband limit 311 and executing a momentum management strategy with the adjusted momentum storage deadband limits. In accordance with the momentum management strategy, a thruster firing performed to desaturate a momentum/reaction wheel is also biased toward providing a velocity change beneficial to the delta-V maneuver.

Figure 4:
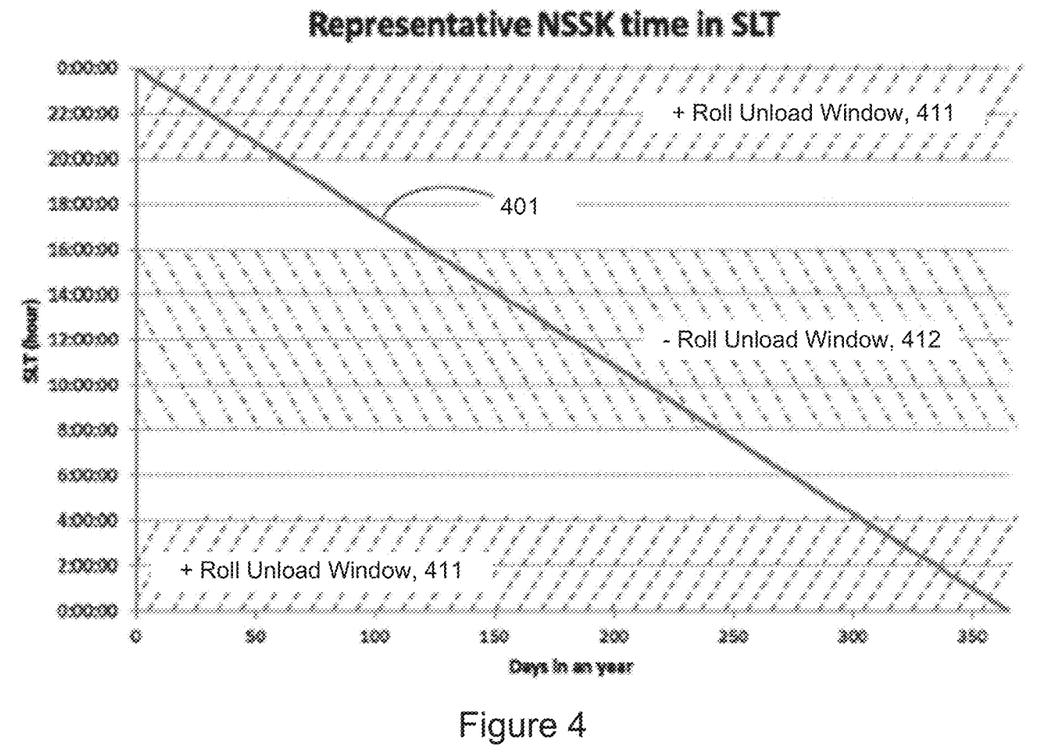
FIG. 4 illustrates an example of desired NSSK maneuver time as a function of time of year.

The strategy may be better appreciated by considering a geosynchronous satellite that requires periodic NSSK maneuvers. The satellite local time at which a NSSK maneuver may preferably be performed is a function of time of year. This is because NSSK maneuvers are preferably performed when the satellite is passing the descending node or ascending node of its orbit. The nodes are alternately passed approximately every twelve hours, and the satellite local times at which the crossings occur vary with time of year as shown (for one node) by line 401 in FIG. 4.

The present inventors have appreciated that, when a preferred NSSK event time is within an unload window, (referring still to FIG. 4, within positive roll unload window 411 or negative roll unload window 412, for example) and the direction of the unload thrust impulse has a substantial component beneficial to the required NSSK delta-V, then the impulse from those unloads advantageously helps reduce the otherwise required NSSK delta-V. Contrariwise, unload impulse with the same direction of thrust during the opposite window (i.e., twelve hours later) disadvantageously increases the otherwise required NSSK delta-V.

Figure 5:
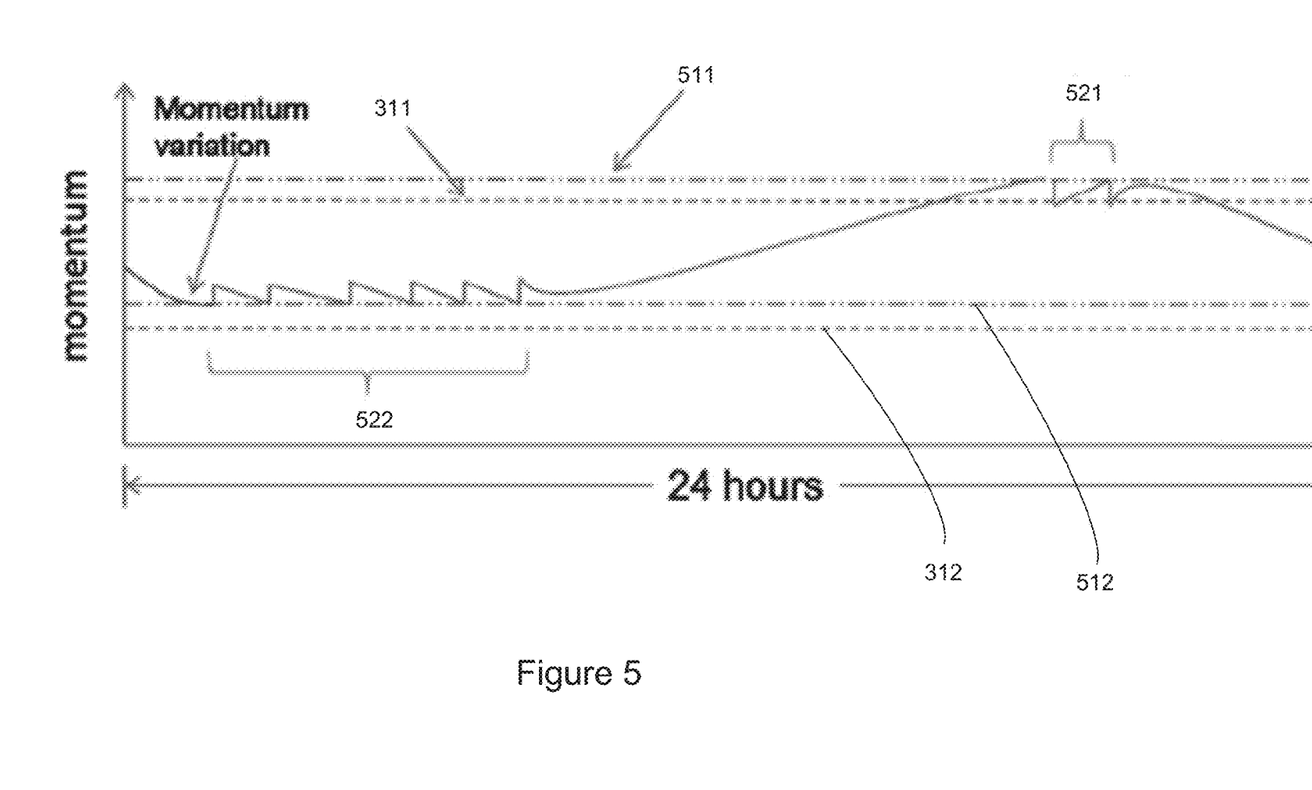
FIG. 5 illustrates an example spacecraft momentum accumulation as a function of time, according to an embodiment.

Thus, according to an embodiment, instead of the nominal momentum storage deadband limits illustrated in FIG. 3, adjusted (biased) deadband limits may be implemented as illustrated, for example, in FIG. 5. The adjustment may be related to a first NSSK (or other delta-V) maneuver window. In the illustrated example, the momentum deadband is adjusted (vertically shifted) from a nominal level to a biased level. More particularly, nominal upper deadband limit 311 may be shifted to a biased upper deadband limit 511, whereas nominal lower deadband limit 312 may be shifted to a biased lower deadband limit 512. As a result, an increased amount of desaturation is required proximate to the first NSSK maneuver window, and a decreaseed amount of desaturation is required proximate to a second NSSK maneuver window. Consequently the number of positive '+' unload firings during time period 522, proximate to the first NSSK maneuver window, is increased and the number of negative '−' unload firing during time period 521, proximate to the second NSSK maneuver window is decreased.

Advantageously, the first NSSK maneuver time is proximate to time period 522 and the direction of '+' unload firings during this period largely coincides with the direction of thruster firings to provide NSSK delta-V. Thus, executing a momentum management strategy with the adjusted first momentum storage deadband limit results in a first thruster firing that performs desaturation of the momentum/reaction wheel and also provides velocity change beneficial to the first NSSK maneuver. By biasing the momentum deadband in the illustrated manner, the number of helpful unload thruster firings is increased while the number of unhelpful unload thruster firings, i.e., during time period 521, is decreased.

The impact of an unload thruster firing on required NSSK delta-V is increased to the extent that the unload firing occurs proximate to the preferred NSSK maneuver time. In some embodiments, therefore, relatively "narrow" and "wide" deadbands may be defined, as illustrated, for example, in FIG. 6. In the illustrated example, the concentration of multiple unloads is increased by narrowing the momentum deadband (defined by upper limit 631 and lower limit 632) at a desired time interval shortly before or after first preferred NSSK maneuver event time 650.

Figure 6:
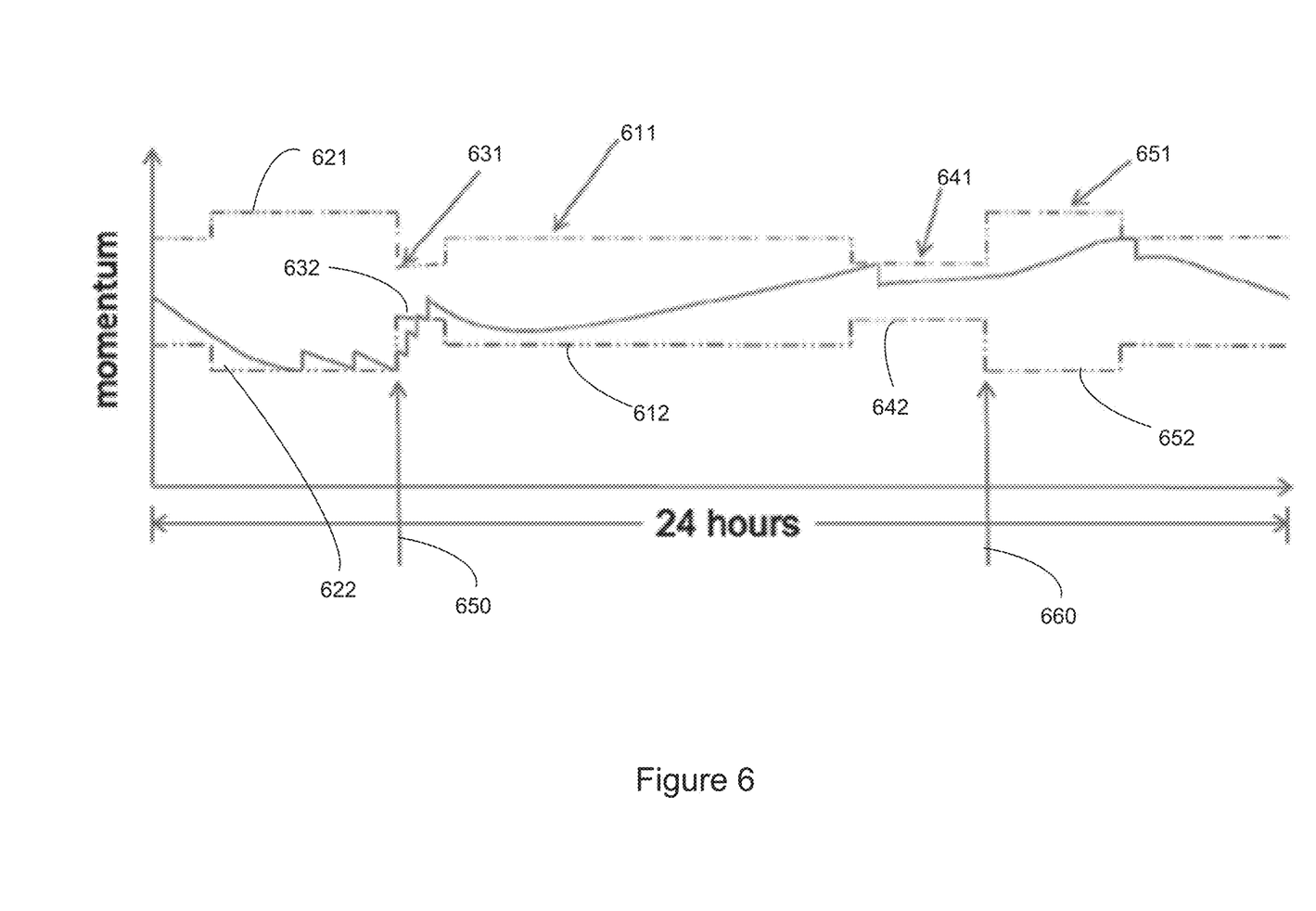
FIG. 6 illustrates an example spacecraft momentum accumulation as a function of time, according to another embodiment

When momentum unloads are undesirable near the preferred NSSK maneuver event time, the momentum deadband may be narrowed some hours prior to maneuver event time. Referring still to FIG. 6, a narrower deadband (defined by upper limit 641 and lower limit 642) may be provided for a period well in advance of the event time 660. Near to or during second preferred NSSK maneuver event time 660, a wider deadband (defined by upper limit 651 and lower limit 652) may be provided.

In the illustrated example, it may be observed that multiple unloads occur near first preferred NSSK maneuver event time 650. Similarly, unloads occur several hours in advance of second preferred NSSK maneuver event time 660. Advantageously, however, unloads are minimized near the second preferred NSSK maneuver event time 660.

The invention can be extended to a satellite with flexibility to switch thruster pairs anytime or at least twice a day (in FIG. 1B, from the pair on south side to north side or vice versa) for momentum management. Since it is possible to direct the unload impulse to the general direction of NSSK delta-V by switching the thruster pair from one side to an opposite side, the momentum deadband is narrowed at a desired time interval prior to or subsequent to ascending and descending node crossing time. As a result, every node crossing may be considered as a favorable time to unload.

Figure 7:
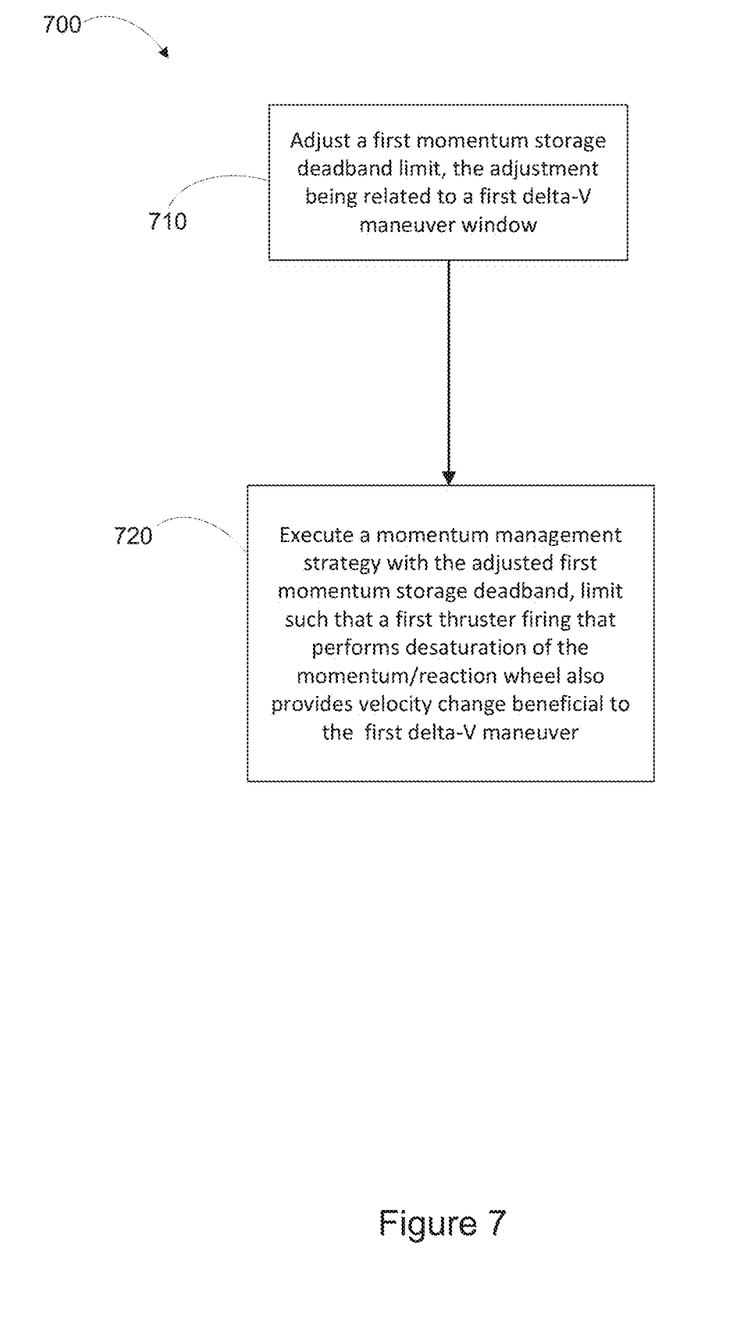
FIG. 7 illustrates an example of a method for spacecraft momentum management.

Referring now to FIG. 7, a method 700 of controlling a body stabilized spacecraft attitude will be described. At block 710, a first momentum storage deadband limit is adjusted, the adjustment being related to a first delta-V maneuver window. The spacecraft may include at least one momentum/reaction wheel configured to maintain the attitude with respect to an axis by storing momentum, and a set of thrusters.

At block 720, a momentum management strategy may be executed with the adjusted first momentum storage deadband limit such that a first thruster firing that performs desaturation of the momentum/reaction wheel also provides velocity change beneficial to the first delta-V maneuver.

Advantageously, the adjustment may include shifting the first momentum storage deadband so as to increase, during a time interval proximate to the first delta-V maneuver window, an amount of desaturation required Thus, spacecraft momentum management techniques have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
controlling an attitude of a body stabilized spacecraft, the spacecraft comprising at least one momentum/reaction wheel configured to maintain the attitude with respect to a spacecraft axis by storing momentum, and a set of thrusters, the controlling including:
executing a momentum management strategy coordinated with a first delta-V maneuver, the first delta-V maneuver to be conducted by firing a first thruster during a first window for conducting the first delta-V maneuver, the momentum management strategy including:
shifting a first momentum storage deadband limit; and
firing a second thruster such that impulse from the second thruster desaturates the momentum/reaction wheel in conformance with the shifted first momentum storage deadband limit, and, at the same time, also provides a velocity change beneficial to the first delta-V maneuver; wherein
the momentum management strategy complies with one or both of a first condition and a second condition, the first condition being that the first thruster is different from the second thruster, and the second condition being that firing the second thruster to desaturate the momentum/reaction wheel occurs at least partially outside the first window.

2. The method of claim 1, wherein shifting the first momentum storage deadband limit increases, during a first time interval proximate to the first window, a first requirement for desaturation impulse.

3. The method of claim 2, wherein:
the momentum management strategy is coordinated with a second delta-V maneuver, the second delta-V maneuver to be conducted during a second window for conducting the second delta-V maneuver, the momentum management strategy further including:
shifting a second momentum storage deadband limit; and
firing one or both of the second thruster and a third thruster such that impulse from the firing desaturates the momentum/reaction wheel in conformance with the shifted second momentum storage deadband limit, and, at the same time, also provides velocity change detrimental to the second delta-V maneuver.

4. The method of claim 3, wherein shifting the second momentum storage deadband limit decreases, during a second time interval proximate to the second window, a second requirement for desaturation impulse.

5. The method of claim 1, wherein the first thruster is an electric thruster, and the second thruster a chemical thruster.

6. The method of claim 1, wherein each of the first thruster and the second thruster is a chemical thruster.

7. The method of claim 1, wherein each of the first thruster and the second thruster is an electric thruster.

8. A method comprising:
controlling an attitude of a 3-axis stabilized spacecraft attitude, the spacecraft being in geosynchronous orbit, and comprising at least one momentum/reaction wheel configured to maintain the attitude with respect to an axis by storing momentum, and a set of thrusters, the controlling including:
executing a momentum management strategy coordinated with a first north south statinkeeping (NSSK) maneuver, the first NSSK maneuver to be conducted by firing a first thruster during a first window for conducting the first NSSK maneuver, the momentum management strategy including:
shifting a first momentum storage deadband limit; and
firing a second thruster such that impulse from the second thruster desaturates the momentum/reaction wheel in conformance with the shifted first momentum storage deadband limit, and, at the same time, also provides a velocity change beneficial to the first NSSK maneuver; wherein
the momentum management strategy complies with one or both of a first condition and a second condition, the first condition being that the first thruster is different from the second thruster, and the second condition being that firing the second thruster to desaturate the momentum/reaction wheel occurs at least partially outside the first window.

9. The method of claim 8, wherein shifting the first momentum storage deadband limit increases, during a first time interval proximate to the first window, a first requirement for desaturation impulse.

10. The method of claim 9, wherein:
the momentum management strategy is coordinated with a second NSSK maneuver, the second NSSK maneuver to be conducted during a second window for conducting the second NSSK maneuver, the momentum management strategy further including:
shifting a second momentum storage deadband limit; and
firing one or both of the second thruster and a third thruster such that impulse from the firing desaturates the momentum/reaction wheel in conformance with the shifted second momentum storage deadband limit, and, at the same time, also provides velocity change detrimental to the second NSSK maneuver.

11. The method of claim 10, wherein shifting the second momentum storage deadband limit decreases, during a second time interval proximate to the second window, a second requirement for desaturation impulse.

12. The method of claim 8, wherein shifting the first momentum storage deadband limit includes narrowing a momentum storage deadband during a first time interval proximate to a crossing of a descending node, and widening the momentum storage deadband during a second time interval proximate to a crossing of an ascending node.

13. The method of claim 8, wherein shifting the first momentum storage deadband limit includes narrowing a momentum storage deadband at a first time interval proximate to a crossing of an ascending node, and widening the momentum storage deadband at a second time interval proximate to a crossing of a descending node.

14. The method of claim 8, wherein the first thruster is an electric thruster, and the second thruster is a chemical thruster.

15. The method of claim 8, wherein each of the first thruster and the second thruster is a chemical thruster.

16. The method of claim 8, wherein each of the first thruster and the second thruster is an electric thruster.

17. A method comprising:
controlling an attitude of a body stabilized spacecraft attitude, the spacecraft comprising at least one momentum/reaction wheel configured to maintain the attitude with respect to an axis by storing momentum, and a set of thrusters, the controlling including:
executing a momentum management strategy coordinated with a first delta-V maneuver, the first delta-V maneuver to be conducted by firing a first thruster during a first window for conducting the first delta-V maneuver, the momentum management strategy including:
making a first adjustment to a momentum storage deadband, the first adjustment being coordinated with the first window, the first adjustment comprising:
a widened deadband proximate to and prior to the first window, and
a narrowed deadband during the first window; and
firing a second thruster, different from the first thruster, such that impulse from the second thruster firing desaturates the momentum/reaction wheel, and, at the same time, also provides a velocity change beneficial to the first delta-V maneuver.

18. The method of claim 17, wherein:
the momentum management strategy is coordinated with a second delta-V maneuver, the second delta-V maneuver to be conducted during a second window for conducting the second delta-V maneuver, the momentum management strategy further including:
making a second adjustment to the momentum storage deadband, the second adjustment being coordinated with the second window, the second adjustment comprising:
a narrowed deadband proximate to and prior to the second window, and a widened deadband during the second window; and
firing one or both of the second thruster and a third thruster such that impulse from the firing desaturates the momentum/reaction wheel, and, at the same time, also provides velocity change detrimental to the second delta-V maneuver.

19. A body stabilized spacecraft, the spacecraft comprising:
at least one momentum/reaction wheel configured to control a spacecraft attitude with respect to an axis by storing momentum;
a set of thrusters; and
a controller communicatively coupled with the at least one momentum/reaction wheel and the set of thrusters, the controller programmed to:
execute a momentum management strategy coordinated with a first delta-V maneuver, the first delta-V maneuver to be conducted by firing a first thruster during a first window for conducting the first delta-V maneuver, the momentum management strategy including:
shifting a first momentum storage deadband limit; and
firing a second thruster such that impulse from the second thruster desaturates the momentum/reaction wheel in conformance with the shifted first momentum storage deadband limit, and, at the same time, also provides a velocity change beneficial to the first delta-V maneuver; wherein
the momentum management strategy complies with one or both of a first condition and a second condition, the first condition being that the first thruster is different from the second thruster, and the second condition being that firing the second thruster to desaturate the momentum/reaction wheel occurs at least partially outside the first window.

20. The spacecraft of claim 19, wherein shifting the first momentum storage deadband limit increases, during a first time interval proximate to the first window, a first requirement for desaturation impulse.

21. The spacecraft of claim 20, wherein:
the momentum management strategy is coordinated with a second delta-V maneuver, the second delta-V maneuver to be conducted during a second window for conducting the second delta-V maneuver, the momentum management strategy further including:
shifting a second momentum storage deadband limit; and
firing one or both of the second thruster and a third thruster such that impulse from the firing desaturates the momentum/reaction wheel in conformance with the shifted second momentum storage deadband limit, and, at the same time, also provides velocity change detrimental to the second delta-V maneuver.

22. The spacecraft of claim 21, wherein shifting the second momentum storage deadband limit decreases, during a second time interval proximate to the second window, a second requirement for desaturation impulse.

23. The spacecraft of claim 19, wherein the first thruster is an electric thruster, and the second thruster is a chemical thruster.

24. The spacecraft of claim 19, wherein each of the first thruster and the second thruster is a chemical thruster.

25. The spacecraft of claim 19, wherein each of the first thruster and the second thruster is an electric thruster.

26. A body stabilized spacecraft configured for operation in geosynchronous orbit, the spacecraft comprising:
at least one momentum/reaction wheel configured to control a spacecraft attitude with respect to an axis by storing momentum;
a set of thrusters; and
a controller communicatively coupled with the at least one momentum/reaction wheel and the set of thrusters, the controller programmed to:
execute a momentum management strategy coordinated with a first north south stationkeeping (NSSK) maneuver, the first NSSK maneuver to be conducted by firing a first thruster during a first window for conducting the first NSSK maneuver, the momentum management strategy including:
shifting a first momentum storage deadband limit; and
firing a second thruster such that impulse from the second thruster desaturates the momentum/reaction wheel in conformance with the shifted first momentum storage deadband limit, and, at the same time, also provides a velocity change beneficial to the first NSSK maneuver; wherein
the momentum management strategy complies with one or both of a first condition and a second condition, the first condition being that the first thruster is different from the second thruster, and the second condition being that firing the second thruster to desaturate the momentum/reaction wheel occurs at least partially outside the first window.

27. The spacecraft of claim 26, wherein shifting the first momentum storage deadband limit increases, during a first time interval proximate to the first window, a first requirement for desaturation impulse.

28. The spacecraft of claim 27, wherein:
the momentum management strategy is coordinated with a second NSSK maneuver, the second NSSK maneuver to be conducted during a second window for conducting the second NSSK maneuver, the momentum management strategy further including:
shifting a second momentum storage deadband limit; and
firing one or both of the second thruster and a third thruster such that impulse from the firing desaturates the momentum/reaction wheel in conformance with the shifted second momentum storage deadband limit, and, at the same time, also provides velocity change detrimental to the second NSSK maneuver.

29. The spacecraft of claim 28, wherein shifting the second momentum storage deadband limit decreases, during a second time interval proximate to the second window, a second requirement for desaturation impulse.

30. The spacecraft of claim 26, wherein shifting the momentum storage deadband limit includes narrowing a momentum storage deadband during a first time interval proximate to a crossing of a descending node, and widening the momentum storage deadband during a second time interval proximate to a crossing of an ascending node.

31. The spacecraft of claim 26, wherein shifting the first momentum storage deadband limit includes narrowing a momentum storage deadband at a first time interval proximate to a crossing of an ascending node, and widening the momentum storage deadband at a second time interval proximate to a crossing of a descending node.

32. The spacecraft of claim 26, wherein the first thruster is an electric thruster, and the second thruster is a chemical thruster.

33. The spacecraft of claim 26, wherein each of the first thruster and the second thruster is a chemical thruster.

34. The method of claim 26, wherein each of the first thruster and the second thruster is an electric thruster.

35. A body stabilized spacecraft, the spacecraft comprising:
at least one momentum/reaction wheel configured to control a spacecraft attitude with respect to an axis by storing momentum;
a set of thrusters; and
a controller communicatively coupled with the at least one momentum/reaction wheel and the set of thrusters, the controller programmed to:
execute a momentum management strategy coordinated with a first delta-V maneuver, the first delta-V maneuver to be conducted by firing a first thruster during a first window for conducting the first delta-V maneuver, the momentum management strategy including:
making a first adjustment to a momentum storage deadband, the first adjustment being coordinated with the first window, the first adjustment comprising:
a widened deadband proximate to and prior to the first window, and
a narrowed deadband during the first window; and
firing a second thruster, different from the first thruster, such that impulse from the second thruster firing desaturates the momentum/reaction wheel, and, at the same time, also provides a velocity change beneficial to the first delta-V maneuver.

36. The spacecraft of claim 35, wherein:
the momentum management strategy is coordinated with a second delta-V maneuver, the second delta-V maneuver to be conducted during a second window for conducting the second delta-V maneuver, the momentum management strategy further including:
making a second adjustment to the momentum storage deadband, the second adjustment being coordinated with the second window, and the second adjustment comprising:
a narrowed deadband proximate to and prior to the second window, and a widened deadband during the second window; and firing one or both of the second thruster and a third thruster such that impulse from the firing desaturates the momentum/reaction wheel, and, at the same time, also provides velocity change detrimental to the second delta-V maneuver.

* * * * *